US011683407B2

(12) United States Patent
Clancy

(10) Patent No.: US 11,683,407 B2
(45) Date of Patent: Jun. 20, 2023

(54) SYSTEM AND METHOD FOR DIGITAL ASSISTANT INTERFACE UTILIZING PLAIN-OLD-TELEPHONE

(71) Applicant: ARRIS ENTERPRISES LLC, Suwannee, GA (US)

(72) Inventor: Paul Andrew Clancy, Johns Creek, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 169 days.

(21) Appl. No.: 17/217,821

(22) Filed: Mar. 30, 2021

(65) Prior Publication Data

US 2021/0314433 A1 Oct. 7, 2021

Related U.S. Application Data

(60) Provisional application No. 63/003,583, filed on Apr. 1, 2020.

(51) Int. Cl.
*H04M 1/27* (2006.01)
*H04M 7/00* (2006.01)
*H04M 19/04* (2006.01)

(52) U.S. Cl.
CPC ......... *H04M 1/271* (2013.01); *H04M 7/0069* (2013.01); *H04M 19/041* (2013.01); *H04M 2201/40* (2013.01); *H04M 2250/74* (2013.01)

(58) Field of Classification Search
CPC ............... H04M 1/271; H04M 7/0069; H04M 19/041; H04M 2201/40; H04M 2250/74;
(Continued)

(56) References Cited

U.S. PATENT DOCUMENTS 7,450,939 B2 * 11/2008 Scheinert .......... H04M 3/42263
455/426.2
8,761,153 B2 * 6/2014 Metcalf ............... H04L 65/1036
370/352
(Continued)

OTHER PUBLICATIONS

Rajan, Dharmaraja. "Secure Flow-Through Provisioning Model in Distributed Network Management Systems." International conference on Networking and Services (ICNS'06). IEEE, 2006. (Year: 2006).*

(Continued)

*Primary Examiner* — Sharad Rampuria
(74) *Attorney, Agent, or Firm* — Panitch Schwarze Belisario & Nadel LLC

(57) ABSTRACT

A system and method for utilizing a plain-old-telephone ("POT") to interface with a digital assistant system. The POT is linked to an interface adapted to selectively provide a bidirectional audio connection to a standard telephone communication network, or to provide an interface to a digital assistant system in response to user voice commands. The functionality of the POT digital assistant interface being dependent upon the user input—DTMF tone/pulse dialing signals as opposed to voice commands spoken into the POT mouthpiece. Audio cues and prompts, as well as audio responses from the digital assistant system are provided to the user via the POT earpiece. Digital assistant functionality is provided via a simple and familiar interface, without impeding any standard voice telephony functionality (making/receiving calls, call waiting, caller ID, etc.)

17 Claims, 4 Drawing Sheets

(58) Field of Classification Search
CPC .......... H04M 3/42204; H04M 3/4935; H04M 1/6041; G10L 15/26
See application file for complete search history.

(56) References Cited

U.S. PATENT DOCUMENTS

| | | | |
|---|---|---|---|
| 9,131,056 B1* | 9/2015 | Chen | H04L 65/1104 |
| 9,602,556 B1* | 3/2017 | Cham | H04L 65/1036 |
| 10,674,001 B1* | 6/2020 | Rao | H04M 1/72484 |
| 10,971,173 B2* | 4/2021 | Kothari | G06N 20/00 |
| 11,062,711 B2* | 7/2021 | Roy | G10L 17/22 |
| 2020/0168228 A1* | 5/2020 | Bouvet | G10L 13/00 |

OTHER PUBLICATIONS

Zhang, Nan, et al. "Dangerous skills: Understanding and mitigating security risks of voice-controlled third-party functions on virtual personal assistant systems." 2019 IEEE Symposium on Security and Privacy (SP). IEEE, 2019. (Year: 2019).*

* cited by examiner

SYSTEM AND METHOD FOR DIGITAL ASSISTANT INTERFACE UTILIZING PLAIN-OLD-TELEPHONE

CROSS-REFERENCE TO RELATED APPLICATION

This application claims the benefit of U.S. Provisional Patent Application No. 63/003,583, filed Apr. 1, 2020, which is incorporated by reference herein in its entirety.

BACKGROUND OF THE INVENTION

Since the release of the Amazon Echo in 2014 and the Google Assistant in 2016, the consumer market has seen an ever-increasing proliferation of voice-responsive digital assistants. These assistants have become almost ubiquitous in both home and workplace environments, as both stand-alone appliances and as integral systems within other products. One commonality among all of these implementations is, of course, a user interface to receive audible commands and requests. This user interface is typically one or more microphones located within the stand-alone device or the system associated with the digital assistant. The received vocal commands/requests are typically collected at the user interface and then transmitted to a digital assistant processing system for parsing and analysis. The digital assistant processing system is typically cloud-based in nature and located off-premises from the user interface.

One of the goals of employing voice-responsive digital assistant systems is to provide an almost ubiquitous or ambient computing experience for users. To that end, digital assistant interfaces have been integrated numerous products and systems, such as household appliances, thermostats, audio systems and television/multimedia systems. The inclusion of a digital assistant interface in these varied systems increases user access, promoting a more ubiquitous user experience within a given environment, such as a residence or business.

Among the systems considered for integration with digital assistant interfaces are Multimedia Terminal Adapters ("MTAs"), which serve to interface a customer premises with the headend of a cable and telecommunication service providers. MTAs typically provide users access to the internet, television, as well as to VOIP and standard telephony service. Ideally, the integration of a digital assistant interface into an MTA, or any other appliance or system, should be accomplished without introducing a need to install additional equipment; this minimizes cost, the systems physical footprint, and avoids the need for users to acquaint themselves with unfamiliar devices or peripherals. For example, digital assistant interfaces are commonly integrated into television units connected to a cable headend via an MTA, or into computing devices connected to the internet via an MTA. However, there is a need to seamlessly integrate a digital assistant interface into a plain-old-telephone ("POT") linked to a telephone service provider (analog or VOIP) via an MTA. A POT is arguably one of the most ubiquitous pieces of technology in the world today; a device, the use of which, almost all people, regardless of age or technical ability, are familiar with.

BRIEF SUMMARY OF THE INVENTION

A system and method for utilizing a POT to interface with a digital assistant system. The POT is linked to an interface adapted to selectively provide a bidirectional audio connection to a standard telephone communication network, or to provide an interface to a digital assistant system in response to user voice commands. The functionality of the POT digital assistant interface being dependent upon the user input—DTMF tone/pulse dialing signals as opposed to voice commands spoken into the POT mouthpiece. Audio cues and prompts, as well as audio responses from the digital assistant system are provided to the user via the POT earpiece. Digital assistant functionality is provided via a simple and familiar interface, without impeding any standard voice telephony functionality (making/receiving calls, call waiting, caller ID, etc.)

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
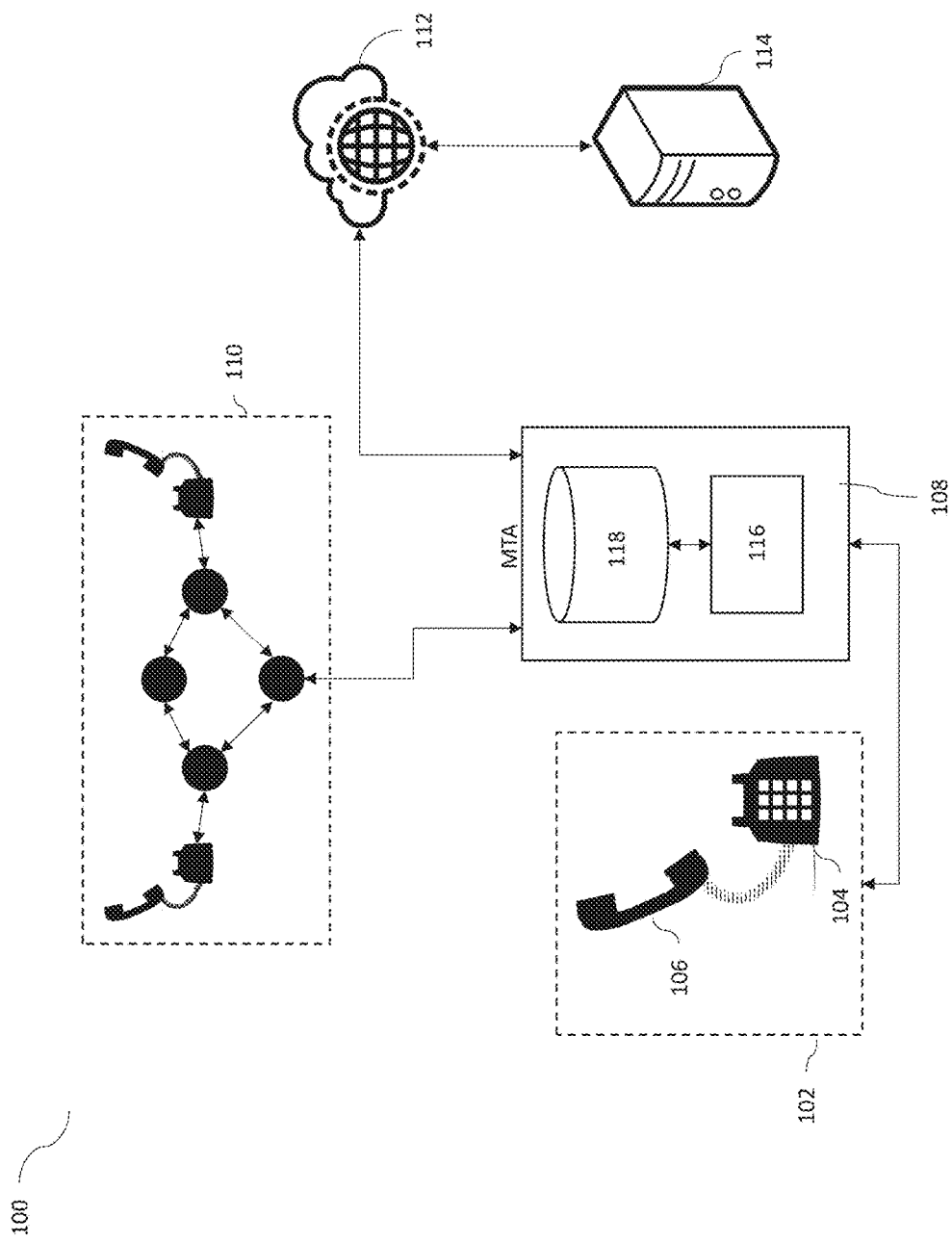
FIG. 1 is a functional diagram of a first preferred embodiment of a POT digital assistant interface system.

FIG. 1 is a functional diagram of a preferred embodiment of a POT digital assistant interface system. As shown, the system 100 includes telephone 102, comprising telephone base 104 and telephone receiver 106, multimedia terminal adapter ("MTA") 108, telecommunication provider 110, network 112 and digital assistant server 114. Digital assistant server 114 is adapted to receive, process and respond to signals indicative of voice commands. Such servers and processing systems are well-known in the art. MTA 108 includes processor 116 and associated memory 118. MTA System 108 serves to control incoming and outgoing communications between telecommunication provider 110, network 112 and telephone 102. Network 112 will be understood to be any network supporting bidirectional digital communications between MTA 108 and digital assistant server 114, including a private network, a public network, the internet, a wired network and/or a wireless network.

Figure 2:
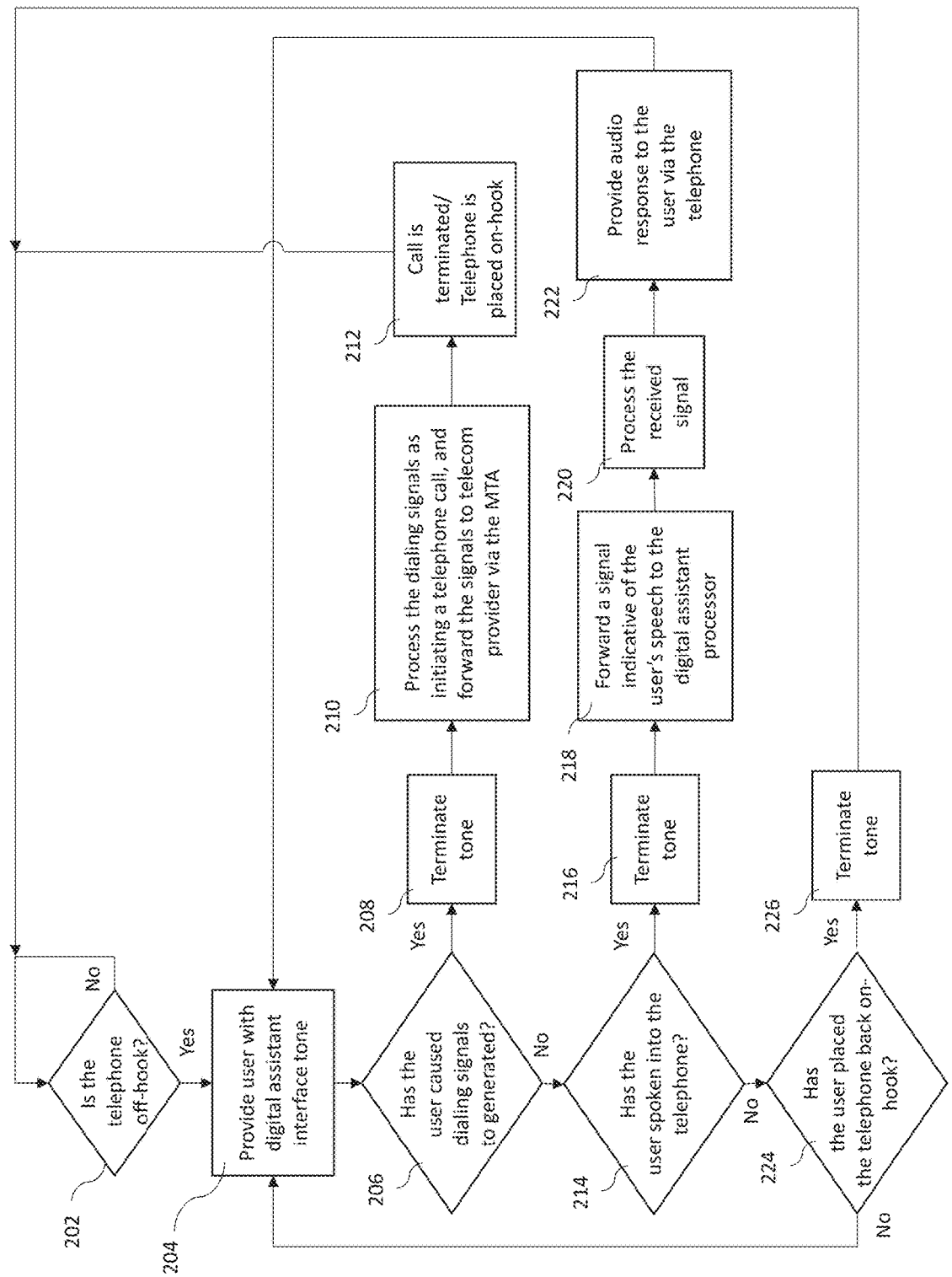
FIG. 2 is a is a flow diagram of operational steps executed within the system of FIG. 1.

Processor 116 is adapted to implement a process comprising the operational steps depicted in the flow diagram of FIG. 2. The process initiates with processor 116 detecting if telephone 102 is in an off-hook state (step 202). When a user causes telephone 102 to be placed in an off-hook condition, MTA generates a digital assistant interface tone that is played through the earpiece of receiver 106 (step 204). This tone is generated such that it is readily distinguishable from the standard dial tone delivered to telephones by POT systems, so as to alert the user that the POT provides an interface to a digital assistant. The tone generated by MTA 108 could be of a differing primary frequency than the standard dial tone, or could be intermittent as opposed to the continuous nature of the standard dial tone, it could even be a spoken message (synthesized by processor 116 or recalled from memory 118) prompting the user to speak a command or request for processing by the digital assistant. Telephone 102 is placed in an off-hook state by a user through the action of removing receiver 106 from its cradle upon telephone base 104, or by the user taking an action such as actuating a particular button upon receiver 106 or upon telephone base 104.

The processor then senses if the user has caused DTMF or pulse dialing signals to be generated by telephone 102 (step 206). If such dialing signals are sensed, processor 106 terminates the generation of activity is sensed, processor 116 terminates the generation of the digital assistant interface tone (step 208), processes the incoming dialing signals and forwards the signals to telecommunication network/provider 110 via MTA 108 (step 210). The dialing signals may be sent by MTA 108 as audio signals, or as a digital communication instructing telecommunication network/provider 110 to complete a connection between MTA 108 and the device corresponding to the number dialed by the user. Telecommunication network/provider 110 could be a true POT telephone system, or a VOIP system. The proper connection is made by telecommunication network/provider 110 and the call initiated at telephone 102 proceeds as any normal phone call would until termination, when the user would place telephone 102 into an on-hook state (step 212).

If at step 206, processor 116 does not sense dialing signals being generated by telephone 102, the processor determines if the user is speaking into the mouthpiece of receiver 106 (step 214). If so, the digital assistant interface tone is terminated (step 216), and processor 116 forwards a signal indicative of the user's speech to digital assistant server 114 via MTA 108 and network 112 (step 218). This forwarding of the signal is performed in accordance with information stored in memory 118 identifying digital assistant server 114 as the proper recipient of voice commands or requests originating from telephone 102. The information stored in memory 118 can include information related to the type of voice signals digital assistant server 114 is adapted to process; such signals may not conform to the same digital coding format as the audio signal produced by telephone 102. For example, the telephone could employ 8-bit μ-law or A-law audio compression, and the digital assistant server 114 operates best with a more dynamic audio signal. Processor 116 would be adapted to pre-process (decompress) the signal received from telephone 102 so as to provide digital assistant server 114 with compatible audio.

The signal is received and processed by digital assistant server 114 (step 220). In response, digital assistant server 114 generates an audio response that is directed to telephone 102 and reproduced by the earpiece of receiver 106 (step 222). This audio response is determined by digital assistant server 114, and can range from the provision of information (the user may have asked a question such as "How many feet are in a mile?"), to confirmation that a certain action has been taken ("A message that you will be late has been forwarded to your spouse"), to messages indicating that the digital assistant server 114 did not understand the user's speech or is incapable of providing the requested information or executing the requested action.

If processor 116 fails to sense dialing signals, or user speech, it will terminate the digital assistant interface tone upon the user placing telephone 102 into an on-hook state (steps 224 and 226).

Figure 3:
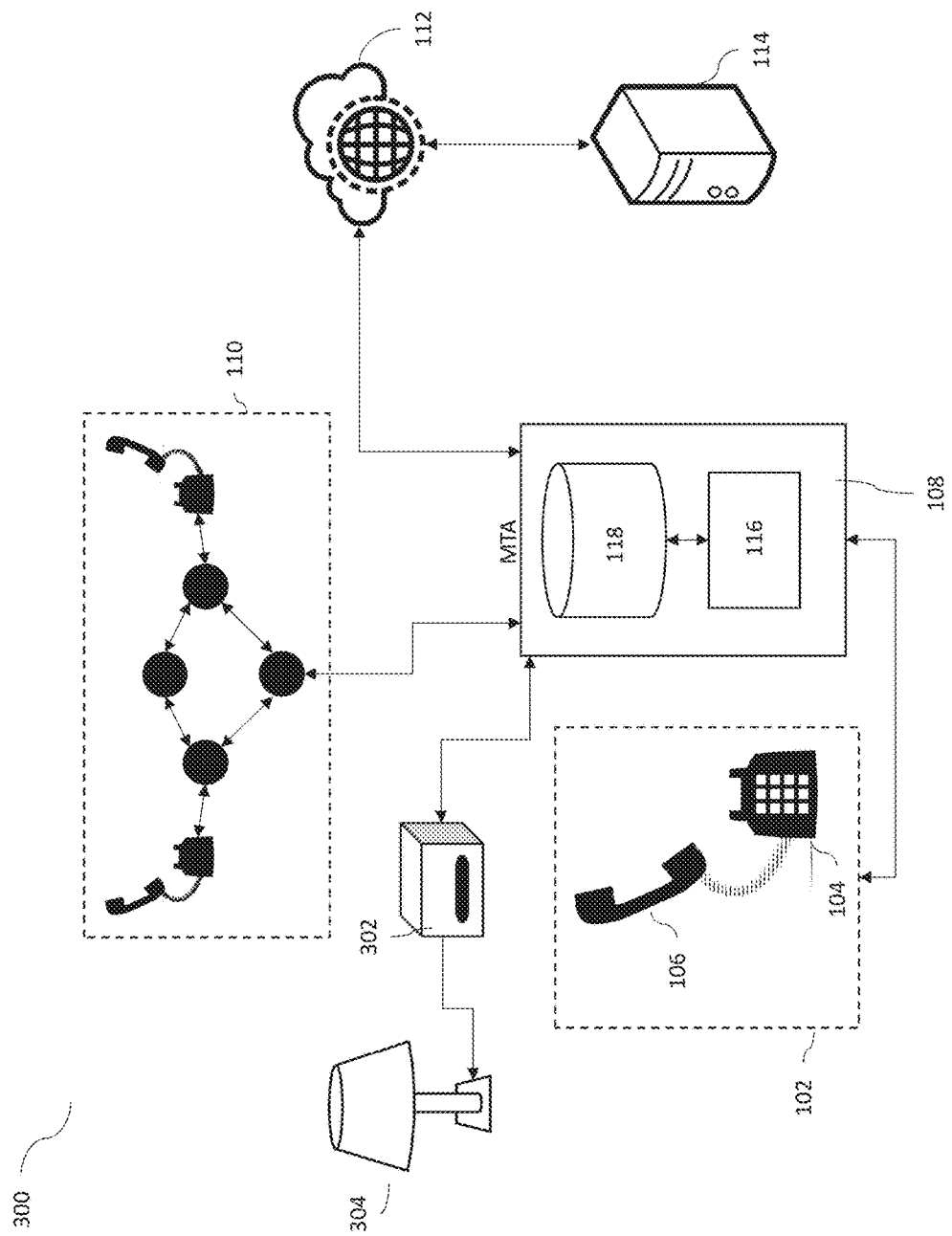
FIG. 3 is a functional diagram of a first alternate configuration of the system of FIG. 1.

A functional diagram of an alternate preferred embodiment of a POT digital assistant interface system. in accordance with the invention is shown in FIG. 3. As shown system 300 includes controller 302 and lighting system 304, in addition to the components of the system 100 (FIG. 1). As shown, controller 302 is linked to MTA 108. This link can be a wired connection (such as an ethernet connection), or wireless connection (such as a Bluetooth® connection). Controller 302 is also adapted to be responsive to commands received from digital assistant server 114 via network 112 and MTA 108, and in response to such received commands control lighting system 304. Such responsive controllers are well-known in the art and will not be discussed further.

In operation, a user would issue a voice command such as "Dim the living room lights" via telephone 102. Processor 116 would forward a signal indicative of this voice command to digital assistant server 114, in a manner similar to that discussed above for the system of FIG. 1. In response to the receipt of the signal, digital assistant server 114 would generate and transmit a command to controller 302 (via network 112 and MTA 108). In response, controller 302 would dim the lights in the user's living room. Digital assistant server 114 digital assistant server 114 would then generate an audio response (confirming the dimming of the lights) and directed the response to telephone 102 (step 222 of FIG. 2). Thus, system 300 enables a user to employ telephone 102 to issue a command to control any system for which digital assistant server 114 is adapted to control. The controlled system may be co-located with telephone 102, or at a remote location linked to digital assistant server 114 via a network (wired or wireless). The audio response generated by digital assistant server 114 to confirm the execution of action requested by the user, can be generated upon the transmission of the command to controller 302. Digital assistant server 114 can also be configured to only send such a confirmation signal to the user's telephone after receiving a signal from controller 302 that the requested action has actually been executed.

It should be understood that controller 302 could be configured to control many other systems unrelated to lighting. Controllers responsive to digital assistant commands are known to control a wide variety of system, including, but not limited to thermostats, household appliances, audio/video systems and automobiles.

Figure 4:
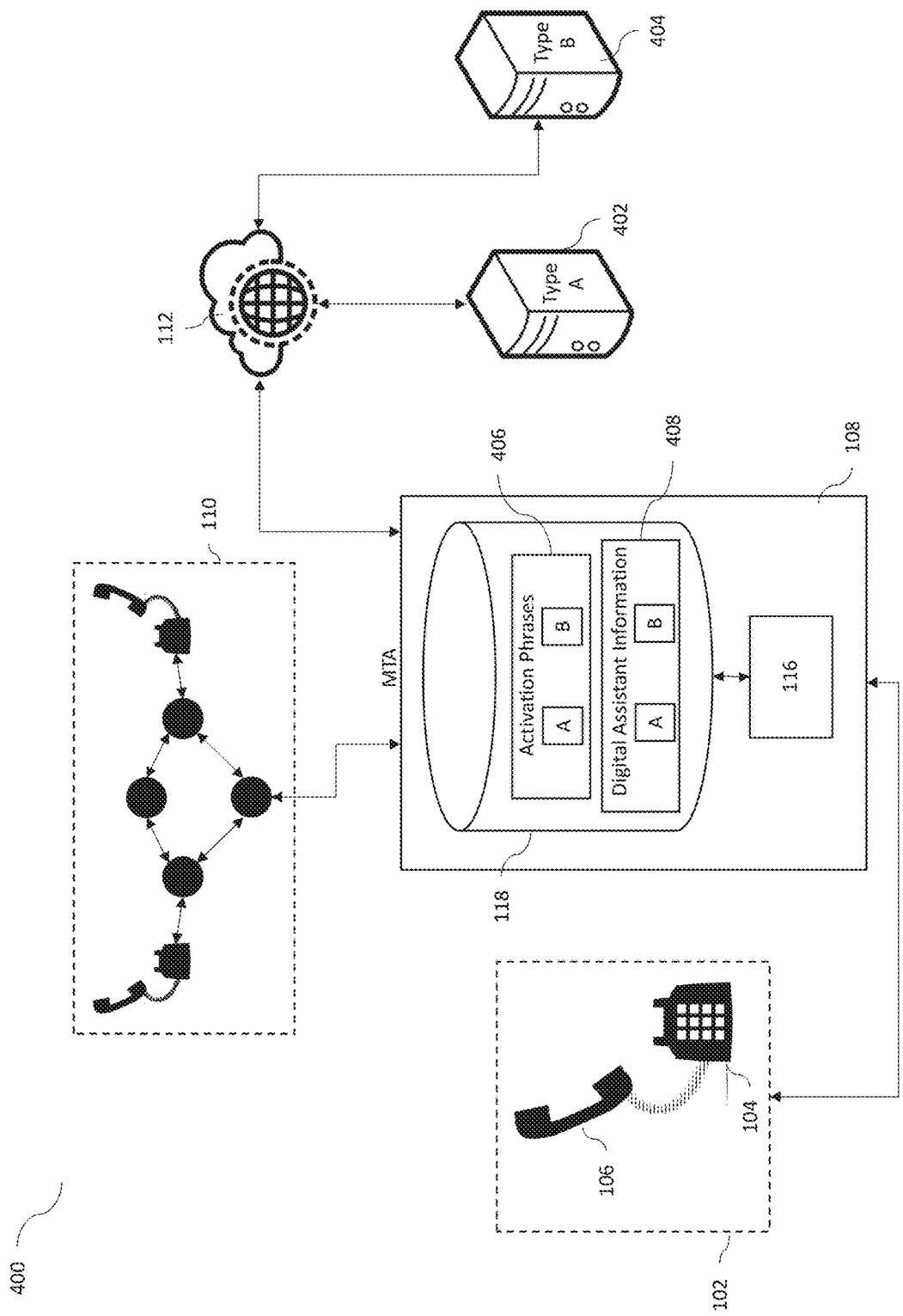
FIG. 4 is a functional diagram of a second alternate configuration of the system of FIG. 1.

FIG. 4 provides a functional diagram of yet another alternate preferred embodiment of a POT digital assistant interface system. in accordance with the invention. As shown system 400 includes digital assistant servers 402 and 404, which are linked via network 112 to MTA 108). It is well-known in the art that certain digital assistants can be adapted to respond only when certain activation phrases are spoken ("Alexa", or "Hey Google", for example). In system 400, digital assistant server 402 is adapted to process voice commands associated with digital assistant systems adapted to respond to activation phrase A, and digital assistant server 404 is adapted to process voice commands associated with digital assistant systems adapted to respond to activation phrase B. Memory 118 is shown to store information indicative of particular activation phrases A and B (406), as well as information indicative of the particular digital server associated with each activation phrase (408).

In operation, when a user speaking into receiver 106 prefaces a spoken command or request with activation phrase A, processor 116 recognizes the phrase based upon information (406) stored in memory 118, and provides digital assistant server 402 with a compatible audio signal representing the user spoken command/request, based upon information (408) stored in memory 108. If the user had a spoken command or request with activation phrase B, processor 116 would have recognized the phrase provided digital assistant server 404 with a compatible audio signal representing the user spoken command/request. Addressing the proper digital assistant server is critical, as certain spoken commands associated with digital assistants adapted to respond to activation phrase A may be incompatible with digital assistant servers adapted to process commands associated with digital assistants adapted to respond to activation phrase B.

Any of the systems discussed above may be further adapted to provide a host of user services. For example, a user may take a POT off-hook and speak the command "Set an alarm for 7:00 AM". Processor 116 would respond by storing information in memory 108 to cause the processor to call the telephone from which the command originated at 7:00 AM and provide an audio response to the individual who takes the POT off-hook in response to the call. This audio response could be a tone, or a spoken message (synthesized by processor 116 or recalled from memory 118) announcing to the recipient that the call was associated with a 7:00 AM alarm request. Following the provision of the audio response, the system could provide the recipient with a digital assistant interface tone, indicating that the system was ready to receive additional commands and requests, or dialing signals to initiate a telephone call.

The system may also be adapted to instruct the telephone from which the alarm request was received to generate an alarm tone without the telephone being placed in an off-hook state, or provide the originating telephone with an instruction to generate a text message upon a telephone associated display, such as one adapted to display caller ID information. This display could be integrated into the telephone receiver or the telephone base, or be located on a separate appliance.

In addition, the system is adapted to permit normal telephone call functionality to continue to be provided to users. For example, processor 118 is adapted to provide a user that is in the process of reciting a spoken command/request into the mouthpiece of receiver 106 with an audible indication of an incoming telephone call. This audible signal could be a tone, or series of tones, or spoken message (synthesized by processor 116 or recalled from memory 118) announcing that a telephone call was being received. In response, the user could indicate that the call should be permitted to connect to telephone 102. This could be done by flashing the off-hook/on-hook state of the phone, or by spoken command. If the preferred method of indicating that a call should be connected to telephone 102 is flashing the off-hook/on-hook state, the call connection process can be directed locally by processor 116 and MTA 108. If, however, preferred method of indicating that a call should be connected is a spoken command, then the associated digital assistant server (114, 402, 404) must be adapted to recognize the command and direct MTA 108 to connect the call.

Although the invention herein has been described with reference to particular embodiments, it is understood that these embodiments are merely illustrative of the principles and applications of the present invention. For example, processor 116 and memory 118 can be integrated into MTA 108, or one or both could be contained within a stand-alone appliance connected to MTA 108. In addition, processor 116 and memory 118 can be co-located on the same premises as telephone 102 and/or MTA 108, or one or both could be could be located remotely and linked to MTA 108 via a network or dedicated connection. Similarly, the digital assistant processor can be collocated with MTA 108 and/or telephone 102. Furthermore, MTA 108 is understood to be capable of supporting multiple telephones and multiple digital assistant processors. The entirety of the disclosed invention could be implemented within a monolithic system, or disparate discrete components without departing from the spirit and scope of the present invention as defined by the appended claims.

The invention claimed is:

1. A digital assistant interface system comprising:
at least one telephone;
at least one controller, comprising at least one processor associated with at least one digital assistant activation phrase and at least one memory, adapted to manage bidirectional communications between the at least one telephone,
at least one telecommunication network and at least one digital assistant command server, wherein:
the memory stores information associating at least one digital assistant server with the at least one telephone; and
the at least one processor is adapted to:
detect dialing signals originating from the telephone and direct the dialing signals to the at least one telecommunication network;
detect signals indicative of voice commands originating from the at least one telephone and direct the signals indicative of voice commands to the at least one digital assistant command server; and
direct the signals indicative of voice commands to the at least one digital assistant command server based, at least in part, upon the information associating the at least one digital assistant processor with the at least one digital assistant activation phrase.

2. The digital assistant interface system of claim 1 further comprising at least one multimedia terminal adapter linking the at least one controller to the at least one telecommunication network and the at least one digital assistant command server.

3. The digital assistant interface system of claim 1 wherein the at least one controller is adapted to provide a tone signal indicative of the availability of digital assistant functionality to the at least one telephone when the telephone is in an off-hook state, wherein the provided tone signal is distinguishable from a standard dial tone signal.

4. The digital assistant interface system of claim 1 wherein:
the memory is further adapted to store information indicative of the type of signals the at least one digital assistant server is adapted to process; and
the at least one processor is further adapted to process the signals indicative of voice commands originating from the at least one telephone in accordance with the information indicative of the type of signals the at least one digital assistant server is adapted to process.

5. The digital assistant interface system of claim 1 wherein the at least one digital assistant command server is adapted to generate an audio response to the signals indicative of voice commands and direct the generated response to the at least one telephone.

6. The digital assistant interface system of claim 5 wherein the audio response provides requested information to a user of the at least one telephone.

7. The digital assistant interface system of claim 1 wherein the at least one digital assistant command server is adapted to generate and direct a command to at least one device other than the at least one telephone in response to the signals indicative of voice commands.

8. The digital assistant interface system of claim 7 wherein the at least one digital assistant command server is adapted to:
generate an audio response confirming the command being directed to the at least one device other than the telephone; and
direct the generated response to the at least one telephone.

9. The digital assistant interface system of claim 1 wherein: the at least one processor is further adapted to compare the detected signals indicative of voice commands to the information indicative of at least one digital assistant activation phrase.

10. A method for processing digital assistant commands comprising:
   detecting signals received from a least one telephone comprising dialing signals and in response directing the dialing signals to the at least one telecommunication network; and
   detecting signals receiving from the least one telephone comprising signals indicative of an activation phrase associated with at least one digital assistant processor and
   voice commands and in response directing the signals indicative of voice commands to at least one associated digital assistant command server.

11. The method of claim 10 wherein the least one telephone is linked to the at least one telecommunication network and the at least one digital assistant command server via at least one multimedia terminal adapter.

12. The method of claim 10 further comprising the step of providing a tone signal indicative of the availability of digital assistant functionality to the at least one telephone when the telephone is in an off-hook state, wherein the provided tone signal is distinguishable from a standard dial tone signal.

13. The method of claim 10 further comprising the step of processing the signals indicative of voice commands originating from the at least one telephone in accordance with information indicative of the type of signals the at least one digital assistant server is adapted to process.

14. The method of claim 10 further comprising the steps of:
   generating an audio response to the signals indicative of voice commands; and
   directing the generated response to the at least one telephone.

15. The method of claim 14 wherein the audio response provides requested information to a user of the at least one telephone.

16. The method of claim 10 further comprising the steps of:
   generating a command to at least one device other than the at least one telephone in response to the signals indicative of voice commands; and
   directing that generated command to the least one device other than the at least one telephone.

17. The method of claim 16 further comprising the steps of:
   generating an audio response confirming the generated command being directed to the at least one device other than the telephone; and
   directing generated audio response to the at least one telephone.

* * * * *